UNITED STATES PATENT OFFICE 2,132,437

PREPARING EDIBLE FAT

Albert S. Richardson and Eddy W. Eckey, Wyoming, Ohio, assignors to The Procter & Gamble Company, Cincinnati, Ohio, a corporation of Ohio No Drawing. Application April 26, 1935, Serial No. 18,466

7 Claims. (Cl. 99—123)

This invention relates to processes for effecting general improvement in the quality of fats for use in cooking and is more particularly concerned with methods for the purification and deodorization of fats, principally with a view to reducing the tendency of the fats to smoke when employed for frying.

Superglycerinated fat, i. e., fat containing excess of combined glycerin over that required for triglyceride formation, has recently come into use for cooking purposes. Monoglycerides and diglycerides of higher fatty acids have been found to improve the shortening action of triglyceride fat in baked goods, especially in cakes containing unusually high quantities of sugar and milk relative to the amount of flour. Likewise food products fried in superglycerinated fat have by many observers been considered to be of superior flavor as compared with the same products when fried in the corresponding triglyceride fat. However, during the frying operation, either in deep frying or in pan frying, superglycerinated fat has been found to give off more smoke than the corresponding triglyceride fat and it is the object of the present invention to overcome in large measure this objectionable characteristic of superglycerinated fat.

In brief, our invention contemplates the performance of a process of vacuum steam deodorization in two stages, the one preceding and the other following the step of forming the mono- and/or diglyceride of higher fatty acids.

The first stage of deodorization, and the first step in our process considered as a whole, involves deodorization of the triglyceride fat in the usual way at high temperature under vacuum. This may be done in one operation if the desired mono- and diglycerides are to be derived from the same fatty acids as the triglyceride portion of the finished product. For convenience of operation, it may be desirable to carry out the first stage of the deodorization as two or more separate operations and this is necessarily the case where the fatty acids from which the monoglyceride or diglyceride are derived differ in composition from the combined fatty acids of the triglyceride portion of the finished product.

The second essential step of our process is to convert at least a portion of the previously deodorized triglyceride fat into monoglyceride and/or diglyceride either by direct reaction of the triglyceride fat with glycerin or by reaction of glycerin with the fatty acids liberated from the deodorized triglyceride fat. Various procedures are known for accomplishing this conversion of triglyceride to mono- and diglyceride.

The third essential step in our process is the second stage of vacuum steam deodorization, to which at least the monoglyceride and diglyceride portion of the final glyceride mixture must be subjected. Any triglyceride fat required in the finished product may also be subjected to this second stage of deodorization or it may be conventionally deodorized in one operation and thereafter blended with the superglycerinated fat separately deodorized in two stages. Also, as more fully explained hereinafter, in the preferred embodiment of our invention the main body of triglyceride fat may be deodorized in two stages but essentially in one operation, near the end of which the mono- and diglyceride mixture is introduced to receive the second stage of its deodorization.

Other processing steps, for example, the blending of fats from different sources, may intervene between the essential steps of our process as set forth above, but these additional steps do not form an essential part of the process in its broad sense.

The treatment of the superglycerinated fat in the second stage of deodorization should be less severe than the treatment in the first with respect to either time or temperature or both. The whole purpose of the first stage of deodorization is to improve flavor and, of the three types of glyceride, the triglyceride is the most resistant to thermal decomposition and therefore best suited to sustained deodorization at high temperature. In the second stage of deodorization some further improvement in flavor occurs, but the primary purpose is to decrease the smoking tendency of the fat when used for frying. We have found that this can be accomplished without any critical loss of combined glycerin content such as tends to occur when mono- or diglyceride fat prepared from undeodorized triglyceride is subjected to sufficient steam deodorization to give a satisfactory flavor.

The theory underlying the improvement in the smoking tendency of fat prepared according to our process is not entirely clear, although in part the explanation is simple. We have found it exceedingly difficult, and almost impossible for purposes of practical manufacture, to wash all the dissolved and uncombined glycerin out of mono- and diglyceride prepared either directly from triglyceride or from free fatty acid. The second stage of deodorization in our process assists in the removal of this free glycerin. There also appears to be some chemical re-arrangement or other change in the second stage of deodorization resulting in a decreased smoking tendency far greater than that which can be attributed to the actual loss of uncombined glycerin. It should be understood that our process is essentially an empirical procedure which we have found accomplishes a useful result, and it will be appreciated that the value of the invention is in no way dependent upon the correctness of even this limited explanation.

We offer the following as specific examples:

Example 1

Partially hydrogenated cottonseed oil of about 70 iodine value was heated under vacuum to 230° C. in a tight still. Oxygen-free steam was blown through the oil at about ½ inch mercury pressure, measured above the level of oil in the still, until the weight of steam amounted to 8% of the oil.

The deodorized product was completely saponified with caustic soda, then acidulated with phosphoric acid to liberate free fatty acids derived from the hardened and deodorized cottonseed oil. The resulting fatty acids were washed with water until free from mineral acid, then placed in a glass flask together with 80% of their weight of C. P. glycerin. The mixture was heated during vigorous mechanical agitation, with protection from the atmosphere by a blanket of nitrogen gas. Heating at a maximum temperature of 230° C. was continued until the acid value of the product was less than 2. The mixture was then cooled and settled to remove the excess of glycerin, and the resulting mixture of glycerides was subjected to a further short deodorization with steam under vacuum: maximum temperature, 190° C.; pressure, about ½ inch of mercury; weight of steam, about 4% of the oil.

Example 2

Partially hydrogenated cottonseed oil of about 70 iodine value was deodorized with steam essentially as described in Example 1, first paragraph. The deodorized product was partially cooled under vacuum, then transferred to another vacuum vessel where it was mixed with about ⅓ its own weight of glycerin containing about 2% dissolved caustic soda, and agitated with steam until the free glycerin disappeared. The resulting mixture, containing chiefly mono- and diglycerides, was cooled under vacuum to about 100° C. Phosphoric acid mixed with filter aid was then added and agitated with the fat mixture during further cooling. The whole mixture was then passed through a filter at 60° C. to remove the filter aid, precipitated sodium phosphate, and some free glycerol.

Another batch of partially hydrogenated cottonseed oil was deodorized as described in the first paragraph of Example 1, then partially cooled under vacuum. To this fat at 200° C. was added 4½% by weight of the filtered fat mixture prepared as described in the preceding paragraph. Deodorization with steam under vacuum was continued for about 95 minutes, the fat being gradually cooled to 120° C. During this cooling period the steam used for deodorization was somewhat more than 3% of the weight of the oil.

Example 3

Steam deodorized corn oil was caused to react with glycerin in presence of alkaline catalyst, and the resulting mixture was acidulated with phosphoric acid, as described in Example 2.

The filtered product was deodorized with steam under vacuum as described in the second paragraph of Example 1.

Among the catalysts suitable for use in the reaction may be mentioned the following: metal salts of carboxylic acids, such as ordinary soap, alcoholates, preferably of an alkali metal, such as sodium glyceroxide, various alkaline or potentially alkaline materials such as sodium carbonate or potassium hydroxide, which are capable of reacting with fatty esters to form soap.

Example 4

Partially hydrogenated cottonseed oil was deodorized with steam under vacuum, at a maximum temperature of 238° C. The deodorized product was cooled and removed from the still. A portion of the deodorized fat was caused to react with glycerin in the presence of alkaline catalyst and at the completion of the reaction was partially cooled and acidulated with phosphoric acid. The filtered product, consisting of a mixture of glycerides containing approximately 21% glycerin, of which a small proportion consisted of dissolved uncombined glycerin, was mixed with the unused portion of the deodorized fat, in the proportion of 4 parts of the superglycerinated fat to 96 parts of the original deodorized fat. This mixture was then heated under vacuum to a maximum temperature of 200° C. and blown with steam amounting to a total of 5 parts by weight percent of oil.

The above examples are primarily intended to be illustrative. While in general we prefer to deodorize the triglycerides at temperatures somewhat above 200° C., for example temperatures varying from 200° C. to 250° C., and to deodorize the converted fat containing monoglyceride or diglyceride at temperatures below 200° C. for example temperatures varying from 140° C. to 200° C., it should be understood that steam deodorization is a distillation process, the efficiency of which is controlled by temperature, pressure, amount of steam, and the nature of the physical contact between the steam and the oil. Thus efficient deodorization of the triglyceride fats can be accomplished at temperatures much below 200° C., for instance lower than 150° C., if a sufficiently large volume of steam is passed through the oil with thorough mixing. Similarly the converted fat containing monoglyceride or diglyceride can be satisfactorily improved with respect to smoking tendency without extensive decomposition by carrying out the second stage of deodorization at a temperature above 200° C. for a very short time, for instance higher than 210° C. Thermal decomposition of the monoglyceride and diglyceride is determined by both temperature and time of heating, so that each of these factors must be considered in connection with the other. We have found that practically all danger of harmful decomposition is avoided if the second stage of deodorization is carried out at a temperature not higher than 180° C., at which temperature the superglycerinated fat can be held several hours without extensive loss of combined glycerin.

Thus if due attention is paid to the precautions set forth above, the exact details of our process may be varied within wide limits. The description already given will enable any skilled operator, with little or no experimentation, to obtain almost the maximum possible improvement in the tendency of a given superglycerinated fat to smoke during frying, and to accomplish this result with little loss of combined glycerin and with little change in the properties of the fat which are specifically associated with its monoglyceride or diglyceride content. In case it is desired to obtain a resistance to smoking almost equal to that of a triglyceride fat, it is desirable to produce initially a superglycerinated fat of more combined glycerin than will be required in the finished product, and deliberately to incur an appreciable loss of combined glycerin by carrying out the second stage of deodorization at a relatively high temperature or for a relatively long time. In any event, the last stage of deodorizing the superglycerinated fat can be satisfactorily carried out so as to retain in the finished product the major part of the combined glycerin originally introduced.

Our process may be applied to any of the commonly used edible fats and oils, such as peanut oil, sesame oil, palm oil, lard or tallow, and it will be understood that in its broader aspect the invention is not limited to any particular edible fat or group of edible fats. The process is especially valuable, however, for the treatment of fats which are plastic in their finished form, since monoglycerides and diglycerides are most useful when embodied in the plastic fats. Thus any of the fat mixtures produced according to the foregoing specific examples would ordinarily be plasticized in suitable chilling and mixing equipment. While some restrictions independent of the present invention apply to use of coconut and similar oils as frying fats, and the monoglycerides of these oils are not of very good flavor, they may nevertheless be used in our process with resulting improvement that is very great as compared with the edible fats produced from the same raw materials in the ordinary way.

Example 2 is not only illustrative of the general process which we claim broadly as our invention, but also serves to illustrate a more specific procedure which we have found to be very useful. Accordingly to this procedure, we prepare a blend of a major proportion of triglyceride fat with a smaller amount of a synthetic fat very high in combined glycerin; the main body of triglyceride fat is subjected to a single deodorization treatment, during the latter part of which the special fat of high glycerin content is added to the deodorizer, in order to effect its second and final stage of deodorization.

Such reference as is made herein to the deodorization of triglyceride fat and the conversion of the deodorized fat at least in part to monoglycerides and diglycerides is of course intended in the broad sense. Thus we may either withdraw from a batch of deodorized triglyceride fat a certain portion thereof and convert this portion to monoglyceride and diglyceride, or we may deodorize separate batches of triglyceride fat, derived either from the same or different fatty acids, and treat one batch to form therein monoglyceride and diglyceride, subsequently combining the two batches in the manner indicated herein. Again, we may form the monoglyceride and diglyceride in situ in the fat which is to form the finished product, either by direct reaction of glycerin with triglyceride or by the conversion of the triglyceride fat to fatty acid and reaction of the fatty acid with glycerin. In any event the monoglyceride and/or diglyceride may be said to be embodied in the triglyceride.

The conversion of any desired percentage of the triglyceride to mono- and/or diglyceride may be effected, for instance from fractions of 1% to approximately 100%. Fat which is to be processed to render it suitable for use in the baking field as well as for frying will preferably contain an excess of combined glycerin over that required for triglyceride formation of not less than .3%, as more fully explained in the prior filed applications of Coith, Richardson, and Votaw, Serial Numbers 655,292, 655,293, 655,294, and 655,295, filed February 4, 1933.

In the foregoing specification the invention is described in specific language to facilitate an understanding of the underlying principles thereof and to indicate the preferred methods of practicing the same. It will nevertheless be appreciated that no limitation of the scope of the invention is thereby intended, but that various modifications and alterations in the procedure are contemplated, such as would occur to one skilled in the art to which the invention relates and fall within the language employed in the appended claims.

Having thus described the invention, what is claimed as new and desired to be secured by Letters Patent is:

1. The process of preparing a deodorized blend of fatty glycerides which comprises treating a body of triglyceride fat with a current of steam under vacuum at elevated temperature and adding thereto during the latter part of said deodorization a smaller quantity of fat containing glycerides selected from the group consisting of monoglycerides and diglycerides derived from previously deodorized triglyceride fat and continuing such treatment for a sufficient period to decrease substantially the tendency of the fat to smoke during frying without extensive loss of combined glycerin from the fat.

2. The method of improving edible fat for use in cooking which comprises subjecting triglyceride fat to a deodorizing process, embodying therein glycerides of the group consisting of monoglycerides and diglycerides, and thereafter subjecting the fat thus formed and constituted to a further deodorizing process.

3. The method of preparing superglycerinated fat for use in cooking which comprises subjecting triglyceride fat to a steam deodorizing process, converting the deodorized product at least in part to glycerides of the group consisting of mono glycerides and diglycerides, and subjecting the resulting mixture of glycerides to a further deodorizing process of a sufficiently less vigorous nature to avoid undesired decomposition thereof.

4. The method of improving edible fat for use in cooking which comprises subjecting triglyceride fat to a steam deodorizing process under vacuum and at a temperature of at least 200° C., embodying therein glycerides of the group consisting of monoglycerides and diglycerides, and thereafter subjecting the fat thus formed and constituted to a further steam deodorizing process under vacuum at a temperature less than 200° C.

5. The method of improving edible fat for use in cooking which comprises subjecting triglyceride fat to a steam deodorizing process under vacuum and at a temperature of at least 200° C., embodying therein glycerides of the group consisting of monoglycerides and diglycerides, and thereafter subjecting the fat thus formed and constituted to a further steam deodorizing process under vacuum at a temperature not greater than 180° C.

6. The method of improving edible fat for use in cooking which comprises subjecting triglyceride fat to a deodorizing process, saponifying the deodorized fat, acidulating the saponified product to liberate the free fatty acids, reacting the fatty acids with glycerin to form glycerides of which at least a portion are of the group consisting of monoglycerides and diglycerides, and subjecting the glycerides thus formed and constituted to a further deodorizing process.

7. The method of improving edible fat for use in cooking which comprises subjecting triglyceride fat to a deodorizing process, converting a separate portion of the deodorized fat, at least in part, to glycerides of the group consisting of monoglycerides and diglycerides by direct reaction of the fat with glycerin, adding the portion thus converted to the remaining triglyceride fat, and subjecting the mixture to a further deodorizing process.

ALBERT S. RICHARDSON.
EDDY W. ECKEY.